US012621254B2

(12) United States Patent
Zhuo et al.

(10) Patent No.: US 12,621,254 B2
(45) Date of Patent: May 5, 2026

(54) METHOD AND APPARATUS FOR A DATA TRANSMISSION OVER A TUNNEL BETWEEN DONOR DISTRIBUTED UNITS

(71) Applicant: Lenovo (Beijing) Limited, Beijing (CN)

(72) Inventors: Yibin Zhuo, Beijing (CN); Mingzeng Dai, Shanghai (CN); Lianhai Wu, Beijing (CN); Le Yan, Shanghai (CN)

(73) Assignee: Lenovo (Beijing) Limited, Beijing (CN)

( * ) Notice: Subject to any disclaimer, the term of this patent is extended or adjusted under 35 U.S.C. 154(b) by 67 days.

(21) Appl. No.: 18/700,996

(22) PCT Filed: Oct. 15, 2021

(86) PCT No.: PCT/CN2021/124052
§ 371 (c)(1),
(2) Date: Apr. 12, 2024

(87) PCT Pub. No.: WO2023/060546
PCT Pub. Date: Apr. 20, 2023

(65) Prior Publication Data
US 2025/0240254 A1      Jul. 24, 2025

(51) Int. Cl.
*H04L 61/5007*      (2022.01)
*H04L 47/70*      (2022.01)
(52) U.S. Cl.
CPC ........ *H04L 47/825* (2013.01); *H04L 61/5007* (2022.05)
(58) Field of Classification Search
CPC .. H04L 47/825; H04L 61/5007; H04W 40/22; H04W 40/24; H04W 88/085; H04W 36/00
(Continued)

(56) References Cited

U.S. PATENT DOCUMENTS

2020/0120725 A1*    4/2020  Mildh ................... H04W 76/12
2021/0168667 A1*    6/2021  Byun ................ H04W 36/0011
(Continued)

FOREIGN PATENT DOCUMENTS

CN          112368988 A      2/2021
WO      2020164546 A1      8/2020
(Continued)

OTHER PUBLICATIONS

Unknown, "3GPP TS 38.340 version 16.1.0 Release 16—Backhaul Adaptation Protocol (BAP) specification", Jul. 2020, etsi.org, www. etsi.org/deliver/etsi_ts/138300_138399/138340/16.01.00_60/ts_ 138340v160100p.pdf (Year: 2020).*
(Continued)

*Primary Examiner* — Ruolei Zong
(74) *Attorney, Agent, or Firm* — FIG. 1 Patents

(57)      ABSTRACT

Embodiments of the present disclosure relate to communication in an IAB network. According to some embodiments of the disclosure, a source donor distributed unit (DU) of a base station comprises a processor and a transceiver coupled to the processor. The source donor DU is coupled to a donor centralized unit (CU) of the base station, and the processor of the source donor DU is configured: to receive, from the donor CU of the base station, address information relating to at least one integrated access and backhaul (IAB) node; and to transmit, via the transceiver, a downlink packet to a target donor DU within at least one target donor DU, wherein the downlink packet is associated with the address information relating to the at least one IAB node.

18 Claims, 7 Drawing Sheets

(58) Field of Classification Search
USPC .......................................................... 709/238
See application file for complete search history.

(56) References Cited

U.S. PATENT DOCUMENTS

| | | | | |
|---|---|---|---|---|
| 2021/0243672 A1* | 8/2021 | Deshmukh | ............ | H04W 40/24 |
| 2021/0378035 A1* | 12/2021 | Zhu | ................... | H04W 36/0019 |
| 2022/0014976 A1* | 1/2022 | Luo | ................... | H04W 36/0044 |
| 2022/0104088 A1* | 3/2022 | Byun | ............... | H04W 36/0235 |
| 2022/0174579 A1* | 6/2022 | Zhuo | ....................... | H04L 45/74 |
| 2022/0201777 A1* | 6/2022 | Teyeb | ................... | H04W 76/11 |
| 2023/0292185 A1* | 9/2023 | Teyeb | ............... | H04W 36/0009 |
| 2024/0187953 A1* | 6/2024 | Barac | ................... | H04W 40/36 |
| 2024/0224154 A1* | 7/2024 | Walldeen | ................ | H04L 45/74 |

FOREIGN PATENT DOCUMENTS

| | | | | | |
|---|---|---|---|---|---|
| WO | 2021025145 A1 | | 2/2021 | | |
| WO | 2021098085 A1 | | 5/2021 | | |
| WO | WO-2022067592 A1 | * | 4/2022 | .......... | H04W 36/087 |
| WO | WO-2022201004 A1 | * | 9/2022 | | |
| WO | WO-2023011621 A1 | * | 2/2023 | ........ | H04W 36/1443 |

OTHER PUBLICATIONS

PCT/CN2021/124052 , "International Preliminary Report on Patentability", International Application No. PCT/CN2021/124052, Apr. 16, 2024, 5 pages.

PCT/CN2021/124052 , "International Search Report and Written Opinion", International Application No. PCT/CN2021/124052, Apr. 26, 2022, 7 pages.

* cited by examiner

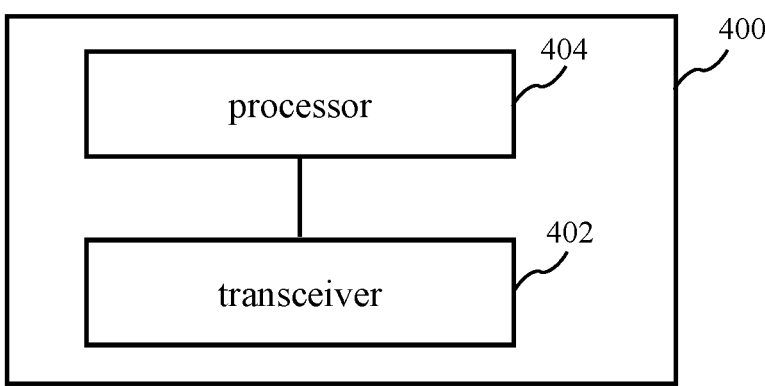

501 | receiving, by a source donor distributed unit (DU) of a base station from a donor centralized unit (CU) of the base station, address information relating to at least one integrated access and backhaul (IAB) node, wherein the source donor DU is coupled to the donor CU 502 | transmitting, by the source donor DU, a downlink packet to a target donor DU within at least one target donor DU, wherein the downlink packet is associated with the address information relating to the at least one IAB node

FIG. 5

600

601 | generating, by a source donor centralized unit (CU) of a base station, identification information relating to at least one target donor distributed unit (DU), so that a downlink packet can be transmitted from a source donor DU to one of the at least one target DU, wherein each target donor distributed unit (DU) within the one or more target donor DUs has a path to at least one integrated access and backhaul (IAB) node, wherein the source donor CU is coupled to the source donor DU 602 | transmitting, by the source donor CU, the identification information relating to the target donor DU to a source donor DU

FIG. 6

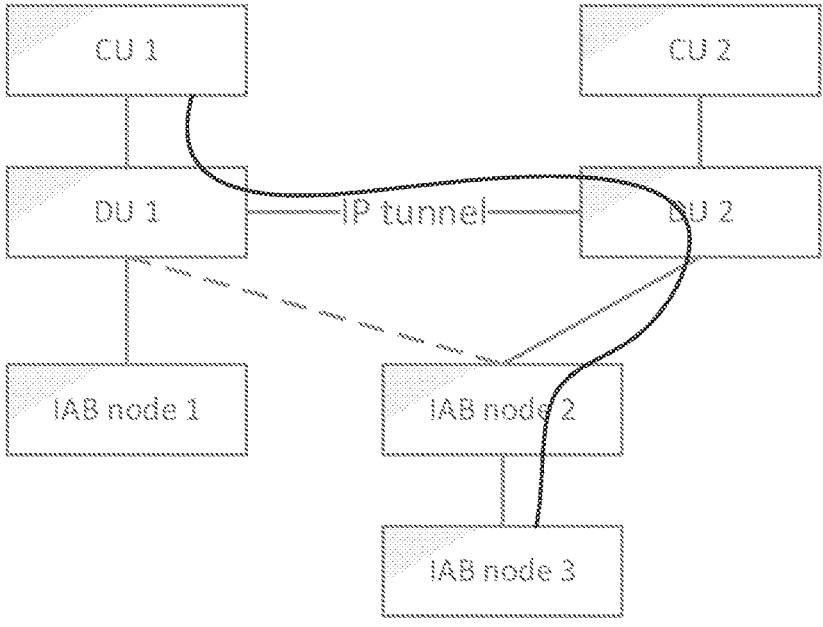

FIG. 7

800

801 — receiving an uplink (UL) packet by an IAB node, wherein a backhaul link destination of the UL packet is a source donor DU of a base station 802 — receiving, by the IAB node, indication information indicating whether a tunnel between the source donor DU and a target donor DU has been setup 803 — rerouting, by the IAB node, the UL packet to the target donor DU, in response to an absence of an available route from the IAB node to the source donor DU and the indication information indicating that the tunnel between the source donor DU and the target donor DU has been setup

901 — receiving, by a source donor centralized unit (CU) of a base station, identification information relating to at least one target donor DU, wherein the identification information identifies a backhaul adaptation protocol (BAP) address or a BAP routing identifier (ID) for each of the at least one target donor DU 902 — transmitting, by the source donor CU, indication information to an integrated access and backhaul (IAB) node, wherein the indication information indicates whether a tunnel between a source donor DU and the at least one target donor DU has been setup

FIG. 9

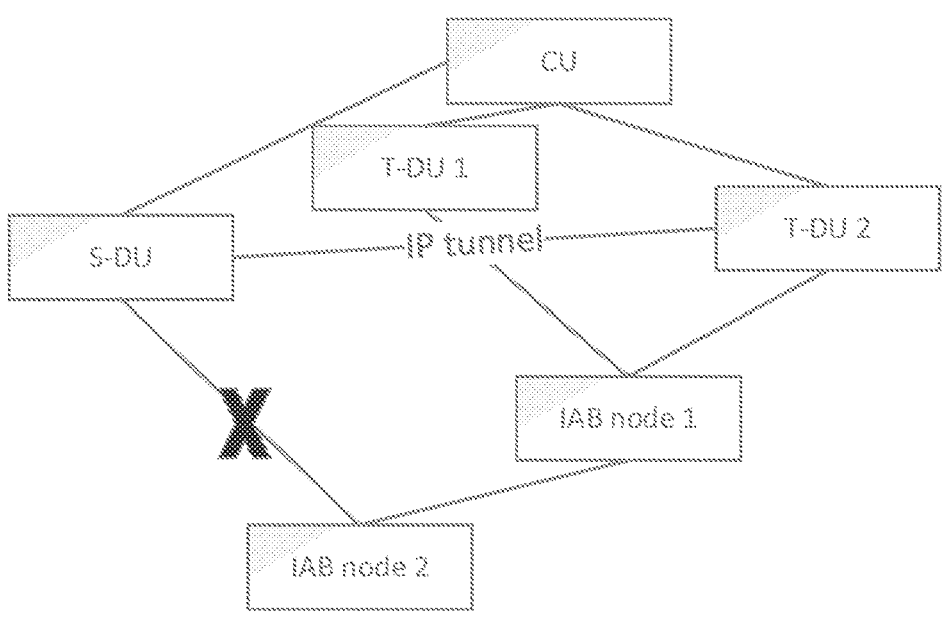

| 1101 | receiving, by a target donor distributed unit (DU) of a base station, one or more uplink (UL) packets from one or more integrated access and backhaul (IAB) nodes |

| 1102 | selecting, by a target donor DU, at least one of a first subset and a second subset within the one or more UL packets based on indication information included in each UL packet of the one or more UL packets, wherein the indication information included in the each UL packet is associated with a source internet protocol (IP) address or a backhaul adaptation protocol (BAP) header of the each UL packet, wherein a backhaul link destination of each UL packet within the first subset is terminated at the target donor DU, and wherein a backhaul link destination of each UL packet within the second subset is terminated at a source donor distributed unit (DU) |

FIG. 11

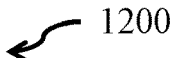

1200

1201 | generating configuration information by a source donor centralized unit (CU) of a base station, wherein the configuration information includes at least one of: mapping relationship between: source IP addresses of one or more UL packets, and identifiers (IDs) of one or more tunnels between the one or more source donor DUs and the target donor DU; mapping relationship between: BAP routing IDs in BAP headers of the one or more UL packets, and the IDs of the one or more tunnels; and mapping relationship between: BAP addresses in the BAP headers of the one or more UL packets, and the IDs of the one or more tunnels 1202 | transmitting, by the source donor CU, the configuration information to a target donor distributed unit (DU)

FIG. 12

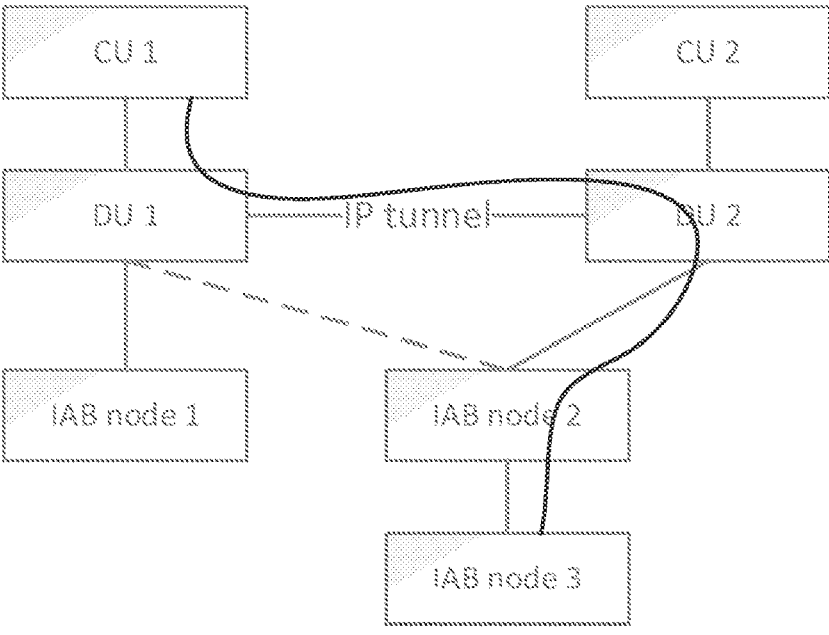

FIG. 13

METHOD AND APPARATUS FOR A DATA TRANSMISSION OVER A TUNNEL BETWEEN DONOR DISTRIBUTED UNITS

TECHNICAL FIELD

Embodiments of the present disclosure generally relate to communication technology, and more particularly to a data transmission over a tunnel between donor distributed units (DUs) in an integrated access and backhaul (IAB) network.

BACKGROUND

Communication systems are widely deployed to provide various telecommunication services, such as telephony, video, data, messaging, broadcasts, and so on. Communication systems may employ multiple access technologies capable of supporting communication with multiple users by sharing available system resources (e.g., time, frequency, and power). Examples of communication systems may include fourth generation (4G) systems, such as long term evolution (LTE) systems, LTE-advanced (LTE-A) systems, or LTE-A Pro systems, and fifth generation (5G) systems which may also be referred to as new radio (NR) systems.

To extend the coverage and availability of communication systems (e.g., 5G systems), the 3rd generation partnership project (3GPP) is envisioning IAB architecture for supporting multi-hop relays. In an IAB network, an IAB node may hop through one or more IAB nodes before reaching a base station (also referred to as "an IAB donor" or "a donor node"). A single hop may be considered a special instance of multiple hops. Multi-hop backhauling is beneficial because it provides a relatively greater coverage extension compared to single-hop backhauling. In a relatively high frequency radio communication system (e.g., radio signals transmitted in frequency bands over 6 GHz), relatively narrow or less signal coverage may benefit from multi-hop backhauling techniques.

The industry desires technologies for handling communications in the IAB network.

SUMMARY

Some embodiments of the present disclosure provide a source donor distributed unit (DU) of a base station. The source donor DU comprises a processor and a transceiver coupled to the processor. The source donor DU is coupled to a donor centralized unit (CU) of the base station, and the processor of the source donor DU is configured: to receive, from the donor CU of the base station, address information relating to at least one IAB node; and to transmit, via the transceiver, a downlink packet to a target donor DU within at least one target donor DU, wherein the downlink packet is associated with the address information relating to the at least one IAB node.

Some embodiments of the present disclosure provide a method performed by a source donor DU of a base station. The source donor DU is coupled to a centralized unit (CU) of the base station. The method may include: receiving, from the donor CU of the base station, address information relating to at least one IAB node; and transmitting a downlink packet to a target donor DU within at least one target donor DU, wherein the downlink packet is associated with the address information relating to the at least one IAB node.

Some embodiments of the present application provide an apparatus. The apparatus includes: a non-transitory computer-readable medium having stored thereon computer-executable instructions, a receiving circuitry; a transmitting circuitry; and a processor coupled to the non-transitory computer-readable medium, the receiving circuitry and the transmitting circuitry, wherein the computer-executable instructions cause the processor to implement the above-mentioned method performed by a source donor DU of a base station.

Some embodiments of the present disclosure provide a source donor centralized unit (CU) of a base station. The source donor CU is coupled to a source donor DU of the base station. The source donor CU comprises a processor and a transceiver coupled to the processor; and the processor is configured: to generate identification information relating to at least one target donor distributed unit (DU), so that a downlink packet can be transmitted from the source donor DU to the target donor DU, wherein each target donor DU within the at least one target donor DU has a path to at least one IAB node; and to transmit, via the transceiver, the identification information relating to the target donor DU to the source donor DU.

Some embodiments of the present disclosure provide a method performed by a source donor CU of a base station. The source donor CU is coupled to a source donor DU of the base station. The method may include: generating identification information relating to at least one target donor distributed unit (DU), so that a downlink packet can be transmitted from the source donor DU to the target donor DU, wherein each target donor DU within the at least one target donor DU has a path to at least one IAB node; and transmitting the identification information relating to the target donor DU to a source donor DU.

Some embodiments of the present disclosure provide a source donor CU of a base station. The source donor CU comprises a processor and a transceiver coupled to the processor; and the processor is configured: to receive, via the transceiver, identification information relating to at least one target donor DU, wherein the identification information identifies a backhaul adaptation protocol (BAP) address or a BAP routing identifier (ID) for each of the at least one target donor DU; and to transmit, via the transceiver, indication information to an IAB node, wherein the indication information indicates whether a tunnel between a source donor DU and the at least one target donor DU has been setup.

Some embodiments of the present disclosure provide a method performed by a source donor CU of a base station. The method may include: receiving identification information relating to at least one target donor DU, wherein the identification information identifies a BAP address or a BAP routing ID for each of the at least one target donor DU; and transmitting indication information to an IAB node, wherein the indication information indicates whether a tunnel between a source donor DU and the at least one target donor DU has been setup.

Some embodiments of the present disclosure provide a source donor CU of a base station. The source donor CU comprises a processor and a transceiver coupled to the processor; and the processor is configured: to generate configuration information; and to transmit, via the transceiver, the configuration information to a target donor DU. The configuration information includes at least one of: mapping relationship between: source IP addresses of one or more UL packets, and identifiers (IDs) of one or more tunnels between the one or more source donor DUs and the target donor DU; mapping relationship between: BAP routing IDs in BAP headers of the one or more UL packets, and the IDs of the one or more tunnels; and mapping relationship between: BAP addresses in the BAP headers of the one or more UL packets, and the IDs of the one or more tunnels.

Some embodiments of the present disclosure provide a method performed by a source donor CU of a base station. The method may include: generating configuration information; and transmitting the configuration information to a target donor DU. The configuration information includes at least one of: mapping relationship between: source IP addresses of one or more UL packets, and identifiers (IDs) of one or more tunnels between the one or more source donor DUs and the target donor DU; mapping relationship between: BAP routing IDs in BAP headers of the one or more UL packets, and the IDs of the one or more tunnels; and mapping relationship between: BAP addresses in the BAP headers of the one or more UL packets, and the IDs of the one or more tunnels.

Some embodiments of the present application provide an apparatus. The apparatus includes: a non-transitory computer-readable medium having stored thereon computer-executable instructions, a receiving circuitry; a transmitting circuitry; and a processor coupled to the non-transitory computer-readable medium, the receiving circuitry and the transmitting circuitry, wherein the computer-executable instructions cause the processor to implement the above-mentioned methods performed by a source donor CU of a base station.

Some embodiments of the present disclosure provide a target donor DU of a base station. The target donor DU comprises a processor and a transceiver coupled to the processor; and the processor is configured: to receive, via the transceiver, one or more uplink (UL) packets from one or more IAB nodes; and to select at least one of a first subset and a second subset within the one or more UL packets based on indication information included in each UL packet of the one or more UL packets, wherein the indication information included in each UL packet is associated with a source internet protocol (IP) address or a BAP header of each UL packet, wherein a backhaul link destination of each UL packet within the first subset is terminated at the target donor DU, and wherein a backhaul link destination of each UL packet within the second subset is terminated at a source donor DU.

Some embodiments of the present disclosure provide a method performed by a target donor DU of a base station. The method may include: receiving one or more UL packets from one or more IAB nodes; and selecting at least one of a first subset and a second subset within the one or more UL packets based on indication information included in each UL packet of the one or more UL packets, wherein the indication information included in each UL packet is associated with a source IP address or a BAP header of each UL packet, wherein a backhaul link destination of each UL packet within the first subset is terminated at the target donor DU, and wherein a backhaul link destination of each UL packet within the second subset is terminated at a source donor DU.

Some embodiments of the present application provide an apparatus. The apparatus includes: a non-transitory computer-readable medium having stored thereon computer-executable instructions, a receiving circuitry; a transmitting circuitry; and a processor coupled to the non-transitory computer-readable medium, the receiving circuitry and the transmitting circuitry, wherein the computer-executable instructions cause the processor to implement the above-mentioned method performed by a target donor DU of a base station.

Some embodiments of the present disclosure provide an IAB node. The IAB node comprises a processor and a transceiver coupled to the processor; and the processor is configured: to receive an UL packet via the transceiver, wherein a backhaul link destination of the UL packet is a source donor DU of a base station; to receive, via the transceiver, indication information indicating whether a tunnel between the source donor DU and a target donor DU has been setup; and reroute, via the transceiver, the UL packet to the target donor DU, in response to an absence of an available route from the IAB node to the source donor DU and the indication information indicating that the tunnel between the source donor DU and the target donor DU has been setup.

Some embodiments of the present disclosure provide a method performed by an IAB node. The method may include: receiving an UL packet, wherein a backhaul link destination of the UL packet is a source donor DU of a base station; receiving indication information indicating whether a tunnel between the source donor DU and a target donor DU has been setup; and rerouting the UL packet to the target donor DU, in response to an absence of an available route from the IAB node to the source donor DU and the indication information indicating that the tunnel between the source donor DU and the target donor DU has been setup.

Some embodiments of the present application provide an apparatus. The apparatus includes: a non-transitory computer-readable medium having stored thereon computer-executable instructions, a receiving circuitry; a transmitting circuitry; and a processor coupled to the non-transitory computer-readable medium, the receiving circuitry and the transmitting circuitry, wherein the computer-executable instructions cause the processor to implement the above-mentioned method performed by an IAB node.

Embodiments of the present disclosure provide technical solutions to facilitate the deployment of the IAB node and can facilitate and improve the implementation of various communication technologies, such as 5G NR.

BRIEF DESCRIPTION OF THE DRAWINGS

In order to describe the manner in which the advantages and features of the disclosure can be obtained, a description of the disclosure is rendered by reference to specific embodiments thereof, which are illustrated in the appended drawings. These drawings depict only exemplary embodiments of the disclosure and are not therefore to be considered limiting of its scope.

FIG. 4 illustrates a block diagram of an exemplary apparatus in accordance with some embodiments of the present disclosure;

FIG. 5 illustrates a flow chart of a method for transmitting a downlink packet to a target donor DU in accordance with some embodiments of the present disclosure;

FIG. 6 illustrates a flow chart of a method for transmitting identification information to a source donor DU in accordance with some embodiments of the present disclosure;

FIG. 7 illustrates an exemplary procedure of communications in accordance with some embodiments of the present disclosure;

FIG. 8 illustrates a flow chart of a method for rerouting an uplink packet to a target donor DU in accordance with some embodiments of the present disclosure;

FIG. 9 illustrates a flow chart of a method for transmitting indication information to an IAB node in accordance with some embodiments of the present disclosure;

FIG. 10 illustrates an exemplary procedure of communications in accordance with some embodiments of the present disclosure;

FIG. 11 illustrates a flow chart of a method for selecting an uplink packet based on indication information in accordance with some embodiments of the present disclosure;

FIG. 12 illustrates a flow chart of a method for transmitting configuration information to a target donor DU in accordance with some embodiments of the present disclosure; and FIG. 13 illustrates an exemplary procedure of communications in accordance with some embodiments of the present disclosure.

DETAILED DESCRIPTION

Figure 1:
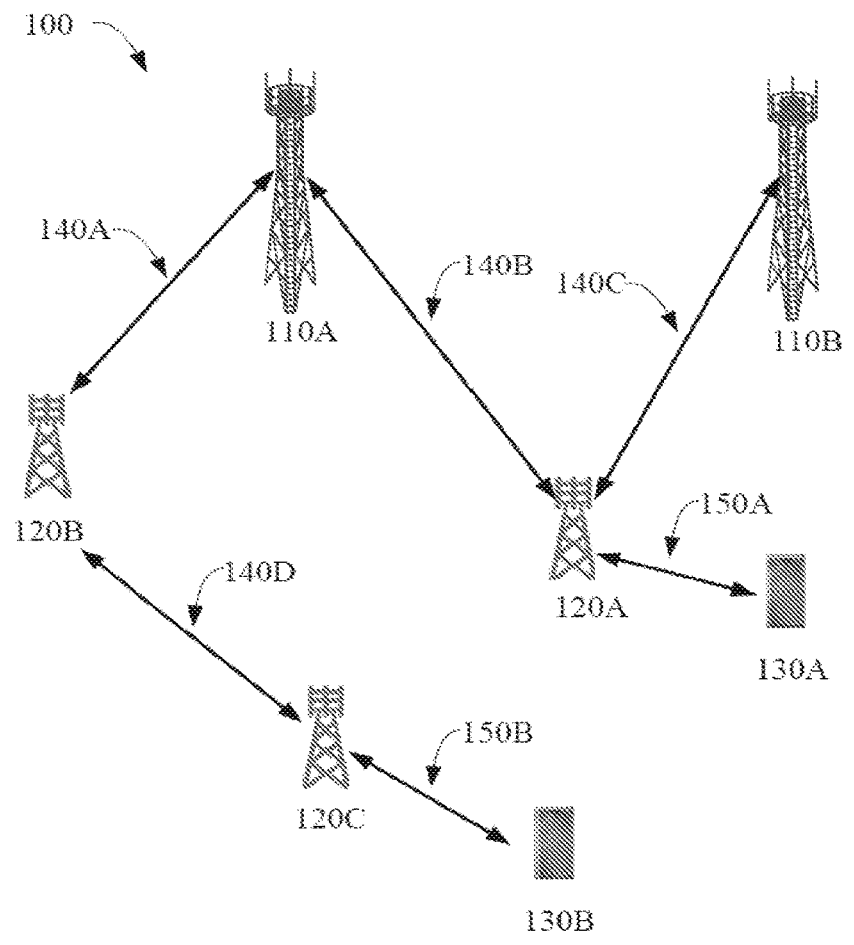
FIG. 1 illustrates a schematic diagram of a communication system in accordance with some embodiments of the present disclosure.

The detailed description of the appended drawings is intended as a description of the preferred embodiments of the present disclosure and is not intended to represent the only form in which the present disclosure may be practiced. It should be understood that the same or equivalent functions may be accomplished by different embodiments that are intended to be encompassed within the spirit and scope of the present disclosure.

Reference will now be made in detail to some embodiments of the present disclosure, examples of which are illustrated in the accompanying drawings. To facilitate understanding, embodiments are provided under specific network architectures and new service scenarios, such as 3GPP LTE and LTE advanced, 3GPP 5G new radio (NR), 5G-Advanced, 6G, and so on. It is contemplated that along with the developments of network architectures and new service scenarios, all embodiments in the present disclosure are also applicable to similar technical problems; and moreover, the terminologies recited in the present disclosure may change, which should not affect the principles of the present disclosure.

Compared with the 4G communication system, the 5G communication system has raised more stringent requirements for various network performance indicators, for example, 1000-times capacity increase, wider coverage requirements, ultra-high reliability and ultra-low latency, etc. Considering the rich frequency resources of high-frequency carriers, the use of high-frequency small station deployments is becoming more and more popular in hotspot areas, in order to meet the needs of 5G ultra-high capacity. However, high-frequency carriers have poor propagation characteristics, severe attenuation due to obstructions, and limited coverage. Therefore, the dense deployment of small stations is required. On the other hand, the deployment of optical fiber is difficult and costly for these small stations. Therefore, an economical and convenient backhaul scheme is needed. Integrated Access and Backhaul (IAB) technology, whose access link and backhaul link both use transmission solutions to avoid fiber deployment, provides ideas for solving the above problems.

In an IAB network, a relay node (RN) or IAB node or a backhaul node/device can provide access services for UEs. That is, a UE can connect to an IAB donor relayed by one or more IAB nodes. And the IAB donor may also be called a donor node or a donor base station (e.g., DgNB, Donor gNodeB). In addition, the link between an IAB donor and an IAB node, or the link between different IAB nodes can be referred to as "backhaul link."

An IAB node may include an IAB mobile terminal (MT) part and an IAB DU part. When an IAB node connects to its parent node (which may be another IAB node or an IAB donor), it can be regarded as a UE, i.e., the role of the MT. When an IAB node provides service to its child node (which may be another IAB node or a UE), it can be regarded as a network device, i.e., the role of the DU.

An IAB donor can be an access network element with a complete base station function, or an access network element with a separate form of a CU and a DU. The IAB donor may be connected to the core network (for example, connected to the 5G core network (5GC)), and provide the backhaul function for the IAB nodes. The CU of an IAB donor may be referred to as "IAB donor-CU" (or directly referred to as "CU"), and the DU of the IAB donor may be referred to as "IAB donor-DU." The IAB donor-CU may be separated into a control plane (CP) and a user plane (UP). For example, a CU may include one CU-CP and one or more CU-UPs.

Considering the small coverage of the high frequency band, in order to ensure the coverage performance of the network, multi-hop networking may be adopted in an IAB network. Taking into account the requirements of service transmission reliability, IAB nodes can support dual connectivity (DC) or multi-connectivity to improve the reliability of transmission, so as to deal with abnormal situations that may occur on the backhaul (BH) link, such as radio link failure (RLF) or blockage, load fluctuations, etc.

In the case where an IAB network supports multi-hop and dual-connection networking, there may be multiple transmission paths between the UE and the IAB donor. A transmission path may include multiple nodes, such as a UE, one or more IAB nodes, and an IAB donor (if the IAB donor is in the form of separate CU and DU, it may also contain an IAB donor-DU and IAB donor-CU). Each IAB node may treat the neighboring node that provides backhaul services for it as a parent node (or parent IAB node), and each IAB node can be regarded as a child node (or child IAB node) of its parent node.

FIG. 1 illustrates a schematic diagram of a communication system in accordance with some embodiments of the present disclosure.

As shown in FIG. 1, the communication system 100 may include some base stations (e.g., IAB donor 110A and IAB donor 110B), some IAB nodes (e.g., IAB node 120A, IAB node 120B, and IAB node 120C), and some UEs (e.g., UE 130A and UE 130B). Although a specific number of UEs, IAB nodes, and IAB donors are depicted in FIG. 1, it is contemplated that any number of UEs, IAB nodes, and IAB donors may be included in the communication system 100.

Each of IAB donor 110A, IAB donor 110B, IAB node 120A, IAB node 120B, and IAB node 120C may be directly connected to one or more IAB node(s) in accordance with some other embodiments of the present disclosure. Each of IAB donor 110A, IAB donor 110B, IAB node 120A, IAB node 120B, and IAB node 120C may be directly connected to one or more UEs in accordance with some other embodiments of the present disclosure.

UE 130A and UE 130B may be any type of device configured to operate and/or communicate in an environment. For example, UE 130A and UE 130B may include a computing device, such as a desktop computer, a laptop computer, a personal digital assistant (PDA), a tablet computer, a smart television (e.g., television connected to the Internet), a set-top box, a game console, a security system (including a security camera), a vehicle on-board computer, a network device (e.g., router, switch, and modem), or the like. According to some embodiments of the present disclosure, UE 130A and UE 130B may include a portable communication device, a smart phone, a cellular telephone, a flip phone, a device having a subscriber identity module, a personal computer, a selective call receiver, or any other device that is capable of transmission and receiving communication signals on a network. In some embodiments of the present disclosure, UE 130A and UE 130B may include wearable devices, such as smart watches, fitness bands, optical head-mounted displays, internet-of-things (IoT) devices, or the like. Moreover, UE 130A and UE 130B may be referred to as a subscriber unit, a mobile, a mobile station, a user, a terminal, a mobile terminal, a terminal, a fixed terminal, a subscriber station, a user terminal, or a device, or described using other terminology used in the art.

IAB donors 110A and 110B may be in communication with a core network (not shown in FIG. 1). The core network (CN) may include a plurality of core network components, such as a mobility management entity (MME) (not shown in FIG. 1) or an access and mobility management function (AMF) (not shown in FIG. 1). The CNs may serve as gateways for the UEs to access a public switched telephone network (PSTN) and/or other networks (not shown in FIG. 1).

The communication system 100 may be compatible with any type of network that is capable of transmission and receiving communication signals. For example, the communication system 100 is compatible with a communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G network, a satellite communications network, a high altitude platform network, and/or other communications networks.

In some embodiments of the present disclosure, the communication system 100 is compatible with 5G NR of the 3GPP protocol. For example, IAB donors 110A and 110B may transmit data using an orthogonal frequency division multiple (OFDM) modulation scheme on the DL. UE 130A and UE 130B may transmit data on the UL using a discrete Fourier transform-spread-orthogonal frequency division multiplexing (DFT-S-OFDM) or cyclic prefix-OFDM (CP-OFDM) scheme. More generally, however, the communication system 100 may implement some other open or proprietary communication protocols, for example, WiMAX, among other protocols.

Persons skilled in the art should understand that as technology develops and advances, the terminologies described in the present disclosure may change, but should not affect or limit the principles and spirit of the present disclosure.

Referring to FIG. 1, IAB node 120A can be directly connected to IAB donors 110A and 110B, and IAB node 120B can be directly connected to IAB donor 110A. IAB donors 110A and 110B are parent nodes of IAB node 120A, and IAB donor 110A is a parent node of IAB node 120B. In other words, IAB nodes 120A and 120B are child IAB nodes of IAB donor 110A, and IAB node 120A is also a child IAB node of IAB donor 110B. IAB node 120C can reach IAB donor 110A by hopping through IAB node 120B. IAB node 120B is a parent IAB node of IAB node 120C. In other words, IAB node 120C is a child IAB node of IAB node 120B.

In some other embodiments of the present disclosure, an IAB node may be connected to IAB node 120C so it can reach IAB donor 110A by hopping through IAB node 120C and IAB node 120B. This IAB node and IAB node 120C may be referred to as the descendant IAB nodes of IAB node 120B.

UEs 130A and 130B can be connected to IAB nodes 120A and 120C, respectively. Uplink (UL) packets (e.g., data or signaling) from UE 130A or UE 130B can be transmitted to an IAB donor (e.g., IAB donor 110A or 110B) via one or more IAB nodes, and then transmitted by the IAB donor to a mobile gateway device (such as the user plane function (UPF) in the 5GC). Downlink (DL) packets (e.g., data or signaling) can be transmitted from the IAB donor (e.g., IAB donor 110A or 110B) after being received by the gateway device, and then transmitted to UE 130A or 130B through one or more IAB nodes.

For example, referring to FIG. 1, UE 130A may transmit UL data to IAB donor 110A or 110B or receive DL data therefrom via IAB node 120A. UE 130B may transmit UL data to IAB donor 110A or receive DL data therefrom via IAB node 120C and IAB node 120B.

In an IAB deployment such as the communication system 100, the radio link between an IAB donor (e.g., IAB donor 110A or 110B in FIG. 1) and an IAB node or between two IAB nodes may be referred to as a backhaul link (BL). The radio link between an IAB donor (e.g., IAB donor 110A or 110B in FIG. 1) and a UE or between an IAB node and a UE may be referred to as an access link (AL). For example, in FIG. 1, radio links 140A to 140D are BLs and radio links 150A and 150B are ALs.

A protocol layer, the BAP layer, located above the radio link control (RLC) layer is introduced in an IAB system, and can be used to realize packet routing, bearer mapping and flow control on the backhaul link.

In some embodiments of the present disclosure, for BAP routing in an IAB network, each UL packet or each DL packet on the BH link may be mapped to a specific BAP routing ID, which may be included in the BAP header. The BAP routing ID may include a BAP address which indicates the BAP address of a destination node in the BH link. The destination nodes of a DL BH link and a UL BH link may be an access IAB node and the DU of an IAB donor, respectively. The BAP routing ID may also include a path ID which indicates the routing path terminated the destination node.

An F1 interface may be established between an IAB node (e.g., the DU part of the IAB node) and an IAB donor (e.g., IAB donor-CU). The F1 interface may support both a user plane protocol (e.g., F1-U) and a control plane protocol (e.g., F1-C). The user plane protocol of the F1 interface may include one or more of a general packet radio service (GPRS) tunneling protocol user plane (GTP-U), user datagram protocol (UDP), internet protocol (IP) and other protocols. The control plane protocol of the F1 interface may include one or more of an F1 application protocol (F1AP), stream control transport protocol (SCTP), IP, and other protocols.

Through the control plane of the F1 interface, an IAB node and an IAB donor can perform, for example, interface management, IAB-DU management, and UE context-related configuration. Through the user plane of the F1 interface, an IAB node and an IAB donor can perform, for example, user plane data transmission and downlink transmission status feedback functions.

Figure 2:
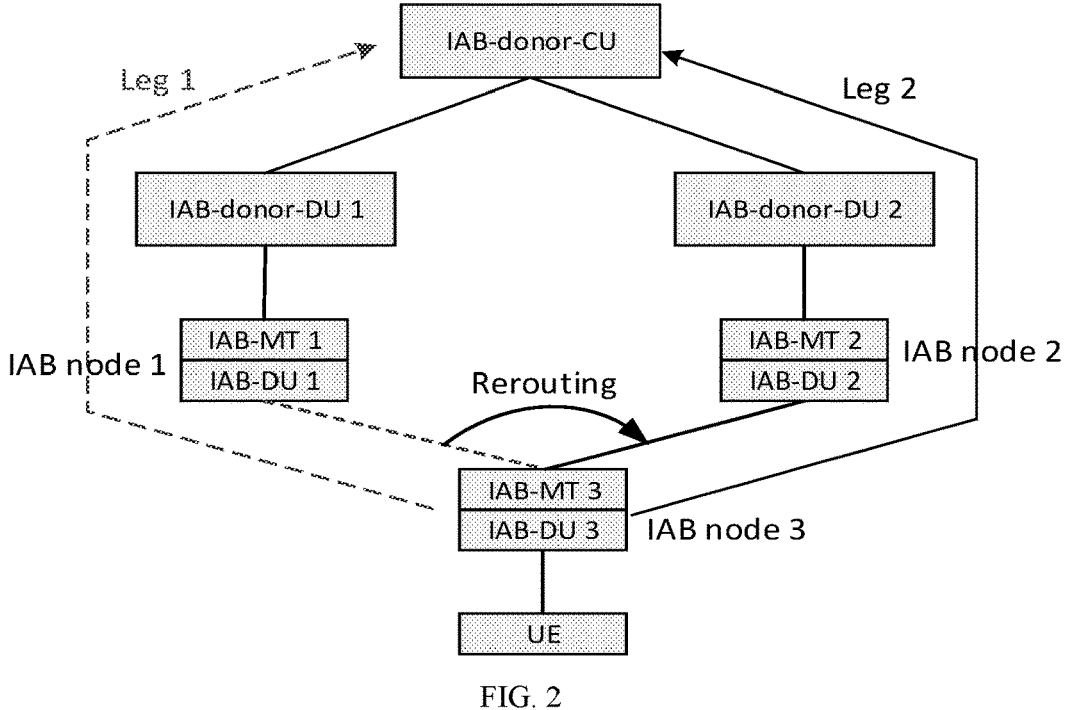
FIG. 2 illustrates a schematic diagram of UL local rerouting in accordance with some embodiments of the present disclosure.

FIG. 2 illustrates a schematic diagram of UL local rerouting in accordance with some embodiments of the present disclosure. As shown in FIG. 2, UL packets destinated to IAB-donor-DU 1 may be rerouted to another IAB-donor-DU 2 due to some trigger conditions, e.g., a RLF. However, IP address(es) of each IAB-donor-DU domain may be different from each other. When UL packets are rerouted from source IAB-donor-DU 1 to target IAB-donor-DU 2, the UL packets with the source IP address(es) related to the source IAB-donor-DU will be discarded due to the source IP filter in the target IAB-donor-DU.

In 3GPP RAN3 112 e-meeting, in order to avoid the IP filtering problem, two remaining solution options that were agreed to be down selected are:

(1) Option 1: The target IAB-donor-DU is provided with the source IP address of re-routed packets. With this option, the IP address(es) of the UL packets originally transmitted to source IAB-donor-DU can be notified to target IAB-donor-DU, and then the target IAB-donor-DU updates the filtering configuration to avoid discard of the rerouting UL packets.

(2) Option 4: Tunnel between source Donor-DU and target Donor-DU. In this Option 4, in order to avoid the source IP filter, a tunnel needs to be established between source IAB-donor-DU and target IAB-donor-DU. Then, the rerouted UL packets received by the target IAB-donor-DU need to be encapsulated with another outer IP header with the source IP address of target IAB-donor-DU. In latest 3GPP RAN3 113 e-meeting, it was agreed to support Option 4 as a baseline.

In some scenarios, an IAB node can be migrated (or handed over) from one IAB donor (source IAB donor) to another IAB donor (target IAB donor). For example, referring back to FIG. 1, IAB node 120C or IAB node 120B may be migrated from IAB donor 110A to IAB donor 110B. During the partial migration procedure, only the MT of the IAB node may be migrated to the target IAB donor. The DU of the IAB node, the descendant IAB node(s) of the IAB node, and UE(s) connected to the IAB node and the descendant IAB node(s) may still be anchored at the source IAB donor. That is, the anchor nodes for the logical F1 connections may not change for the IAB node and the descendant IAB node(s) of the IAB node. In some embodiments of the present disclosure, the F1 transport path for the DU of the IAB node and the DU(s) of the descendant IAB node(s) of the IAB node may need to be migrated from the source path to the target path.

Figure 3:
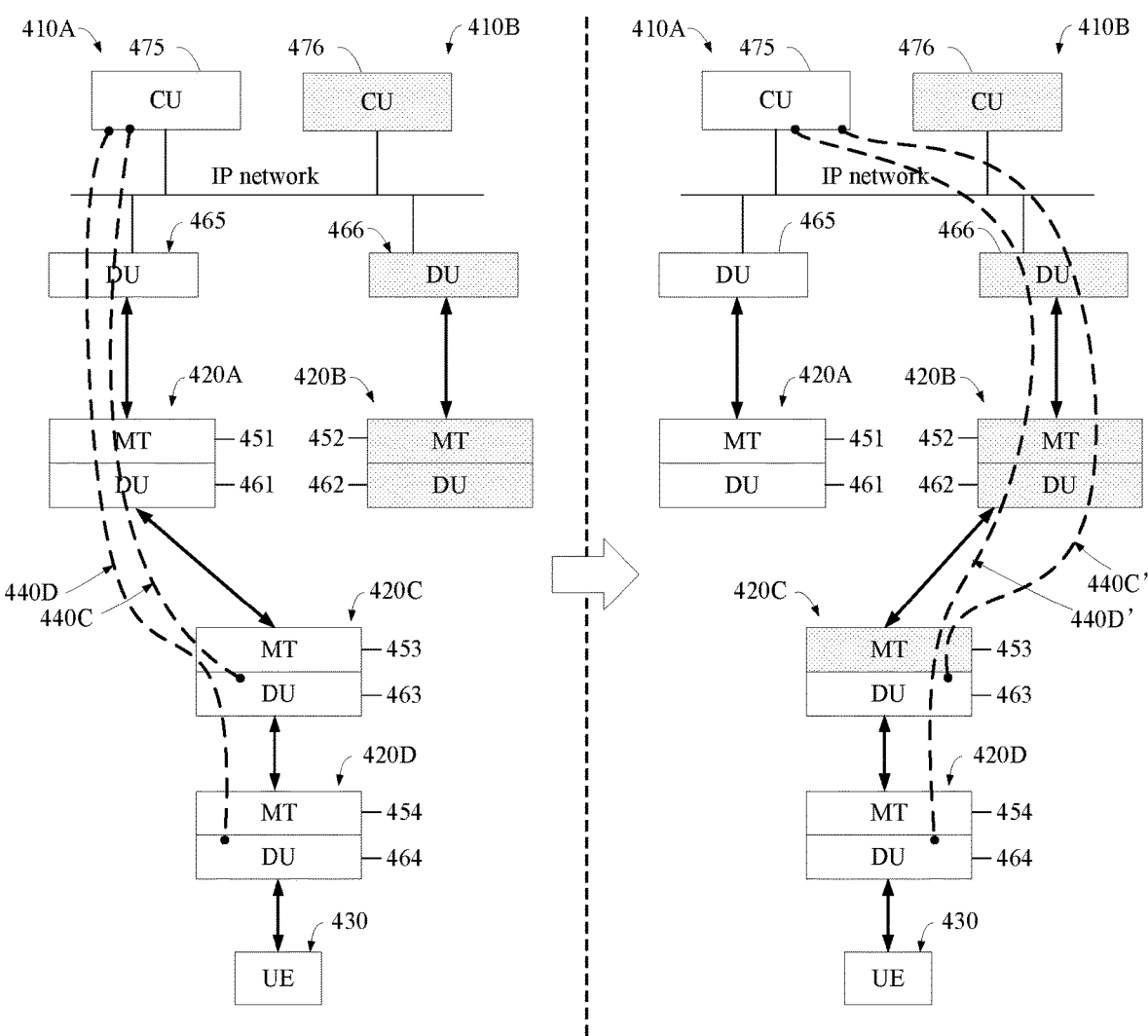
FIG. 3 illustrates a schematic diagram of IAB node migration in accordance with some embodiments of the present disclosure.

FIG. 3 illustrates a schematic diagram of IAB node migration in accordance with some embodiments of the present disclosure. Details described in all of the foregoing embodiments of the present disclosure are applicable for the embodiments shown in FIG. 3.

In FIG. 3, IAB donor 410A may include CU 475 and DU 465, and IAB donor 410B may include CU 476 and DU 466. IAB node 420A may be directly connected to IAB donor 410A and may include MT 451 and DU 461. IAB node 420B may be directly connected to IAB donor 410B and may include MT 452 and DU 462. IAB node 420C may include MT 453 and DU 463. IAB node 420D may be connected to IAB node 420C, and may include MT 454 and DU 464, and UE 430 may be connected to IAB node 420D. IAB node 420D may be referred to as an access IAB node of UE 430.

The left part of FIG. 3 shows an IAB network before the migration of IAB node 420C. In the left part of FIG. 3, IAB node 420C can reach IAB donor 410A via IAB node 420A, and IAB node 420D can reach IAB donor 410A via IAB node 420C and IAB node 420A. Both MT 453 and DU 463 of IAB node 420C may be anchored at CU 476 of IAB donor

410A. 440C denotes an F1 signaling flow between DU 463 and CU 475 and 440D denotes an F1 signaling flow between DU 464 and CU 475.

The right part of FIG. 3 shows an IAB network after the migration of IAB node 420C, in which only MT 453 of IAB node 420C is migrated from IAB donor 410A to IAB donor 410B and DU 463 of IAB node 420C is still under the control of IAB donor 410A. In other words, MT 453 is anchored at CU 476 and DU 463 is still anchored at CU 475. 440C' denotes an F1 signaling flow between DU 463 and CU 475 and 440D' denotes an F1 signaling flow between DU 464 and CU 475.

Currently, several issues may need to be resolved in the topology of the right part of FIG. 3.

In particular, during a downlink (DL) data transmission in a partial migration procedure, an issue is that a source donor DU needs to differentiate between normal DL packet(s) and the DL packet(s) that needs to be tunneled, and the rerouted DL packet(s) need to be associated with the according migration IAB node. During a DL data transmission in a partial migration procedure, a further issue that needs to be solved is that a source donor DU needs to know the information about a migration IAB node connecting to which target donor DU(s) (not all target donor DUs have the connection to the migration IAB node), and then, the source donor DU forwards DL packet(s) to a proper target donor DU.

For an uplink (UL) data transmission during a local rerouting procedure from a viewpoint of a migration IAB node, since a tunnel may not be setup between all donor DU pairs, an issue that needs to be solved is that UL packet(s) may be randomly rerouted to a wrong target donor DU which has not setup a tunnel between a source donor DU. Similar to a DL data transmission, during a UL data transmission for a local rerouting procedure or a partial migration procedure from a viewpoint of a target donor DU, a further issue that needs to be solved is that a target donor DU needs to differentiate between normal UL packet(s) and the UL packet(s) that needs to be tunneled, and then, the target donor DU transmits the UL packet(s) to a proper source donor DU.

Embodiments of the present disclosure provide solutions to enhance data transmissions over a tunnel between donor DUs, which can solve the above issues. More details on the embodiments of the present disclosure will be illustrated in the following text in combination with the appended drawings.

FIG. 4 illustrates a block diagram of an exemplary apparatus in accordance with some embodiments of the present disclosure. As shown in FIG. 4, the apparatus 400 may include at least one processor 404 and at least one transceiver 402 coupled to the processor 404. The transceiver 402 may be a wired transceiver or a wireless transceiver. The apparatus 400 may be a donor CU, a donor DU, or an IAB node.

Although in this figure, elements such as the at least one transceiver 402 and processor 404 are described in the singular, the plural is contemplated unless a limitation to the singular is explicitly stated. In some embodiments of the present application, the transceiver 402 may be divided into two devices, such as a receiving circuitry and a transmitting circuitry. In some embodiments of the present application, the apparatus 400 may further include an input device, a memory, and/or other components.

In some embodiments of the present application, the apparatus 400 may be a donor CU. The transceiver 402 and the processor 404 may interact with each other so as to perform the operations with respect to the donor CU described in FIGS. 5-13.

In some further embodiments of the present application, the apparatus 400 may be a donor DU. The transceiver 402 and the processor 404 may interact with each other so as to perform the operations with respect to the donor DU described in FIGS. 5-13.

In some other embodiments of the present application, the apparatus 400 may be an IAB node. The transceiver 402 and the processor 404 may interact with each other so as to perform the operations with respect to the IAB node described in FIGS. 5-13.

In some embodiments of the present application, the apparatus 400 may further include at least one non-transitory computer-readable medium. For example, in some embodiments, the non-transitory computer-readable medium may have stored thereon computer-executable instructions to cause the processor 404 to implement the method with respect to the donor CU, the donor DU, or the IAB node as described in FIGS. 5-13. In some other embodiments, the computer-executable instructions, when executed, cause the processor 404 interacting with the transceiver 402, so as to perform the operations with respect to the donor CU, the donor DU, or an IAB node described in FIGS. 5-13.

In particular, in some embodiments of the present application, the apparatus 400 may be a source donor DU (e.g., DU 465 illustrated and shown in FIG. 3 or DU 1 illustrated and shown in FIG. 7) of a base station. The source donor DU is coupled to a donor CU of the base station. The processor 404 of the source donor DU may be configured: to receive, from the donor CU (e.g., CU 1 illustrated and shown in FIG. 7) of the base station, address information relating to at least one IAB node (e.g., IAB node 2 and/or IAB node 3 illustrated and shown in FIG. 7); and to transmit, via the transceiver 402, a downlink packet to a target donor DU (e.g., DU 2 illustrated and shown in FIG. 7) within at least one target donor DU. The downlink packet may be associated with the address information relating to the at least one IAB node. A specific example is described in embodiments of FIG. 7 as follows.

In some embodiments, the at least one IAB node is a migration IAB node (e.g., IAB node 2 illustrated and shown in FIG. 7) which is migrated from the source donor DU to the target donor DU. In some further embodiments, the at least one IAB node is one or more descendant IAB nodes (e.g., IAB node 3 illustrated and shown in FIG. 7) of the migration IAB node. In some embodiments, the received address information includes at least one of: (1) at least one IP address of a migration IAB node (e.g., IAB node 2 illustrated and shown in FIG. 7); or (2) at least one IP address of each (e.g., IAB node 3 illustrated and shown in FIG. 7) of one or more descendant IAB nodes of the migration IAB node.

According to some embodiments, the processor 404 of the source donor DU is configured to receive, via the transceiver 402 from the donor CU (e.g., CU 1 illustrated and shown in FIG. 7), configuration information regarding mapping relationship between a subset of the address information and the target donor DU (e.g., DU 2 illustrated and shown in FIG. 7). The transmitted downlink packet may be associated with the subset of the address information.

According to some embodiments, the processor 404 of the source donor DU is configured to receive, via the transceiver 402 from the donor CU, identification information relating to the at least one target donor DU. In some embodiments, the identification information includes: (1) an ID of a tunnel (e.g., IP tunnel illustrated and shown in FIG. 7) between the source donor DU and a target donor DU within the at least one target donor DU; and/or (2) a peer IP address of the target donor DU. The peer IP address may be associated with the tunnel between the source donor DU and the target donor DU.

In some embodiments of the present application, the apparatus 400 may be a source donor CU (e.g., CU 475 illustrated and shown in FIG. 3 or CU 1 illustrated and shown in FIG. 7) of a base station. The source donor CU is coupled to a source donor DU of the base station. The processor 404 of the source donor CU may be configured: to generate identification information relating to at least one target donor DU (e.g., DU 2 illustrated and shown in FIG. 7), so that a downlink packet can be transmitted from the source donor DU to the target donor DU, wherein each target donor DU within the at least one target donor DU has a path to at least one IAB node (e.g., IAB node 2 and/or IAB node 3 illustrated and shown in FIG. 7); and to transmit, via the transceiver 402, the identification information relating to the target donor DU to the source donor DU (e.g., DU 1 illustrated and shown in FIG. 7). A specific example is described in embodiments of FIG. 7 as follows.

According to some embodiments, the identification information may include at least one of: (1) an identifier (ID) of a tunnel between the source donor DU and the target donor DU (e.g., DU 2 illustrated and shown in FIG. 7); or (2) a peer IP address of the target donor DU within the target donor DU, wherein the peer IP address is associated with the tunnel between the source donor DU and the target donor DU.

In some embodiments, the at least one IAB node is a migration IAB node (e.g., IAB node 2 illustrated and shown in FIG. 7) which is migrated from the source donor DU to the target donor DU. In some further embodiments, the at least one IAB node is one or more descendant IAB nodes (e.g., IAB node 3 illustrated and shown in FIG. 7) of the migration IAB node. In some embodiments, the processor 404 of the source donor CU may be further configured to receive, via the transceiver 402 from a target donor CU (e.g., CU 2 illustrated and shown in FIG. 7), information regarding the at least one target donor DU, in response to the migration IAB node performing an inter CU migration procedure from "the source donor DU that is connected to the source donor CU (e.g., CU 1 illustrated and shown in FIG. 7)" to "the target donor DU that is connected to the target donor CU (e.g., CU 2 illustrated and shown in FIG. 7)".

In some embodiments of the present application, the apparatus 400 may be an IAB node (e.g., IAB node 420D illustrated and shown in FIG. 3 or IAB node 2 illustrated and shown in FIG. 10). The processor 404 of the IAB node may be configured: to receive UL packet(s) via the transceiver 402, wherein a backhaul link destination of the UL packet(s) is a source donor DU (e.g., S-DU illustrated and shown in FIG. 10) of a base station; to receive, via the transceiver 402, indication information indicating whether a tunnel (e.g., IP tunnel illustrated and shown in FIG. 10) between the source donor DU and a target donor DU (e.g., T-DU 2 illustrated and shown in FIG. 10) has been setup; and to reroute, via the transceiver 402, the UL packet(s) to the target donor DU, in response to an absence of an available route from the IAB node to the source donor DU and the indication information indicating that the tunnel between the source donor DU and the target donor DU has been setup. A specific example is described in embodiments of FIG. 10 as follows.

In some embodiments, if a current path between the IAB node and the source donor DU is unavailable and if the indication information indicates that the tunnel between the source donor DU and the target donor DU has been setup, the UL packet(s) is rerouted by the IAB node (e.g., IAB node 2 illustrated and shown in FIG. 10) to the target donor DU (e.g., T-DU 2 illustrated and shown in FIG. 10).

According to some embodiments, the indication information is received from a donor CU (e.g., CU illustrated and shown in FIG. 10) that is connected to the source donor DU (e.g., S-DU illustrated and shown in FIG. 10). According to some embodiments, the indication information includes at least one of:

(1) configuration information regarding a backup BAP address for a BAP address;

(2) configuration information regarding a backup BAP routing ID for a BAP routing ID;

(3) configuration information regarding an unavailable BAP address for the BAP address; or (4) configuration information regarding an unavailable BAP routing ID for the BAP routing ID.

In some embodiments of the present application, the apparatus 400 may be a source donor CU (e.g., CU 475 illustrated and shown in FIG. 3 or CU illustrated and shown in FIG. 10) of a base station. The processor 404 of the source donor CU may be configured: to receive, via the transceiver 402, identification information relating to at least one target donor DU (e.g., T-DU 1 and T-DU 2 illustrated and shown in FIG. 10), wherein the identification information identifies a BAP address or a BAP routing ID for each of the at least one target donor DU; and to transmit, via the transceiver 402, indication information to an IAB node. The indication information indicates whether a tunnel (e.g., IP tunnel illustrated and shown in FIG. 10) between a source donor DU and the at least one target donor DU has been setup. A specific example is described in embodiments of FIG. 10 as follows.

According to some embodiments, the indication information includes at least one of:

(1) configuration information regarding a backup BAP address for a BAP address of a target donor DU within the at least one target donor DU;

(2) configuration information regarding a backup BAP routing ID for a BAP routing ID of the target donor DU within the at least one target donor DU;

(3) configuration information regarding an unavailable BAP address for the BAP address; or (4) configuration information regarding an unavailable BAP routing ID for the BAP routing ID.

In some embodiments, if the BAP address identified by the identification information is of a target donor DU (e.g., T-DU 2 illustrated and shown in FIG. 10) and a tunnel (e.g., IP tunnel illustrated and shown in FIG. 10) between the source donor DU and the target donor DU has been setup, the indication information includes the configuration information regarding the backup BAP address for the BAP address of the target donor DU. If the BAP routing ID identified by the identification information is of the target donor DU and the tunnel between the source donor DU and the target donor DU has been setup, the indication information includes the configuration information regarding the backup BAP routing ID for the BAP routing ID of the target donor DU. If the BAP address identified by the identification information is of a target donor DU and the tunnel between the source donor DU and the target donor DU has not been setup, the indication information includes the configuration information regarding the unavailable BAP address for the BAP address of the target donor DU. If the BAP routing ID identified by the identification information is of the target donor DU and the tunnel between the source donor DU and the target donor DU has not been setup, the indication information includes the configuration information regarding the unavailable BAP routing ID for the BAP routing ID of the target donor DU.

According to some embodiments, the identification information is received from a target donor CU (e.g., a CU not shown in FIG. 10), if the IAB node performs an inter CU migration procedure from "the source donor DU (e.g., S-DU illustrated and shown in FIG. 10) that is connected to the source donor CU (e.g., CU illustrated and shown in FIG. 10)" to "a target donor DU (e.g., T-DU 2 illustrated and shown in FIG. 10), that is connected to the target donor CU, within the at least one target donor DU".

In some embodiments of the present application, the apparatus 400 may be a target donor DU (e.g., DU 466 illustrated and shown in FIG. 3 or DU 2 illustrated and shown in FIG. 13) of a base station. The processor 404 of the target donor DU may be configured: to receive, via the transceiver 402, one or more UL packets from one or more IAB nodes (e.g., IAB node 2 and/or IAB node 3 illustrated and shown in FIG. 13); and to select a 1st subset and/or a 2nd subset within the one or more UL packets based on indication information included in each UL packet of the one or more UL packets. The indication information included in each UL packet is associated with a source IP address or a BAP header of each UL packet. A backhaul link destination of each UL packet within the 1st subset is terminated at the target donor DU. A backhaul link destination of each UL packet within the 2nd subset is terminated at a source donor DU (e.g., DU 1 illustrated and shown in FIG. 3). A specific example is described in embodiments of FIG. 13 as follows.

According to some embodiments, the indication information included in each UL packet indicates: whether a source IP address of each UL packet is within an IP pool of the target donor DU (e.g., DU 2 illustrated and shown in FIG. 13); or an indication in a BAP header of each UL packet. In some embodiments, the indication is added by an IAB node (e.g., IAB node 2 illustrated and shown in FIG. 13) to the BAP header of each UL packet. In some embodiments, the IAB node (e.g., IAB node 2 illustrated and shown in FIG. 13) is a boundary IAB node which performs a BAP header rewriting operation for each UL packet.

According to some embodiments, a tunnel between the target donor DU and the source donor DU has been setup, and the processor 404 of the target donor DU is further configured to transmit, via the transceiver 402 via the tunnel, the 2nd subset of UL packet(s) to the source donor DU.

According to some embodiments, the processor 404 of the target donor DU is further configured to receive, via the transceiver 402, configuration information from a donor CU (e.g., CU illustrated and shown in FIG. 10) connected to the target donor DU.

In some embodiments, the configuration information includes at least one of:

(1) mapping relationship between: source IP addresses of the one or more UL packets, and identifiers (IDs) of one or more tunnels between the one or more source donor DUs and the target donor DU;

(2) mapping relationship between: BAP routing IDs in BAP headers of the one or more UL packets, and the IDs of the one or more tunnels; and (3) mapping relationship between: BAP addresses in the BAP headers of the one or more UL packets, and the IDs of the one or more tunnels.

In some embodiments of the present application, the apparatus 400 may be a source donor CU (e.g., CU 475 illustrated and shown in FIG. 3 or CU 1 illustrated and shown in FIG. 13) of a base station. The processor 404 of the source donor CU may be configured: to generate configuration information; and to transmit, via the transceiver 402, the configuration information to a target donor DU (e.g., DU 2 illustrated and shown in FIG. 13). The configuration information may include at least one of: (1) mapping relationship between: source IP addresses of one or more UL packets, and IDs of one or more tunnels between the one or more source donor DUs and the target donor DU; (2) mapping relationship between: BAP routing IDs in BAP headers of the one or more UL packets, and the IDs of the one or more tunnels; and (3) mapping relationship between: BAP addresses in the BAP headers of the one or more UL packets, and the IDs of the one or more tunnels. A specific example is described in embodiments of FIG. 13 as follows.

FIG. 5 illustrates a flow chart of a method for transmitting a downlink packet to a target donor DU in accordance with some embodiments of the present disclosure. The embodiments of FIG. 5 may be performed by a source donor DU (e.g., DU 1 illustrated and shown in FIG. 7) of a base station. Although described with respect to a source donor DU, it should be understood that other devices may be configured to perform a method similar to that of FIG. 5.

In the exemplary method 500 as shown in FIG. 5, in operation 501, a source donor DU (e.g., DU 1 illustrated and shown in FIG. 7) of a base station receives, from a donor CU (e.g., CU 1 illustrated and shown in FIG. 7) of the base station address information relating to at least one IAB node (e.g., IAB node 2 and/or IAB node 3 illustrated and shown in FIG. 7). The source donor DU is coupled to a centralized unit (CU) of the base station.

In some embodiments, the at least one IAB node is: a migration IAB node (e.g., IAB node 2 illustrated and shown in FIG. 7) which is migrated from the source donor DU to the target donor DU; or one or more descendant IAB nodes (e.g., IAB node 3 illustrated and shown in FIG. 7) of the migration IAB node. In some embodiments, the received address information includes: (1) at least an IP address of a migration IAB node (e.g., IAB node 2 illustrated and shown in FIG. 7); and/or (2) at least an IP address of each (e.g., IAB node 3 illustrated and shown in FIG. 7) of one or more descendant IAB nodes of the migration IAB node.

In operation 502, the source donor DU transmits a downlink packet to a target donor DU (e.g., DU 2 illustrated and shown in FIG. 7) within at least one target donor DU. The downlink packet may be associated with the address information relating to the at least one IAB node.

It is contemplated that the method illustrated in FIG. 5 may include other operation(s) not shown, for example, any operation(s) described with respect to FIGS. 4, 6, and 7. For example, in some embodiments, the source donor DU (e.g., DU 1 illustrated and shown in FIG. 7) receives, from the donor CU (e.g., CU 1 illustrated and shown in FIG. 7), configuration information regarding mapping relationship between a subset of the address information and the one target donor DU (e.g., DU 2 illustrated and shown in FIG. 7), and the downlink packet is associated with the subset of the address information.

In some embodiments, the source donor DU receives, from the donor CU, identification information relating to the at least one target donor DU (e.g., DU 1 and DU 2 illustrated and shown in FIG. 7). In some cases, the identification information includes: (1) an ID of a tunnel (e.g., IP tunnel illustrated and shown in FIG. 7) between the source donor DU and a target donor DU within the at least one target donor DU; and/or (2) a peer IP address of the target donor DU, wherein the peer IP address is associated with the tunnel between the source donor DU and the target donor DU.

Details described in all other embodiments of the present application (for example, details regarding how to transmit a downlink packet to a target donor DU) are applicable for the embodiments of FIG. 5. Moreover, details described in the embodiments of FIG. 5 are applicable for all embodiments of FIGS. 1, 4, 6, and 7.

FIG. 6 illustrates a flow chart of a method for transmitting identification information to a source donor DU in accordance with some embodiments of the present disclosure. The embodiments of FIG. 6 may be performed by a source donor CU (e.g., CU 1 illustrated and shown in FIG. 7) of a base station. Although described with respect to a source donor CU, it should be understood that other devices may be configured to perform a method similar to that of FIG. 6.

In the exemplary method 600 as shown in FIG. 6, in operation 601, a source donor CU of a base station generates identification information relating to at least one target donor DU (e.g., DU 1 and DU 2 illustrated and shown in FIG. 7), so that a downlink packet can be transmitted from the source donor DU to the target donor DU. Each target donor DU within the at least one target donor DU has a path to at least one IAB node (e.g., IAB node 2 and/or IAB node 3 illustrated and shown in FIG. 7). In operation 602, the source donor CU transmits the identification information relating to the target donor DU to a source donor DU (e.g., DU 1 illustrated and shown in FIG. 7).

According to some embodiments, the identification information may include: (1) an ID of a tunnel between the source donor DU and a target donor DU within the at least one target donor DU; and (2) a peer IP address of the target donor DU within the at least one target donor DU, wherein the peer IP address is associated with the tunnel between the source donor DU and the target donor DU.

In some embodiments, the at least one IAB node is a migration IAB node which is migrated from the source donor DU to the target donor DU. In some further embodiments, the at least one IAB node is one or more descendant IAB nodes of the migration IAB node.

It is contemplated that the method illustrated in FIG. 6 may include other operation(s) not shown, for example, any operation(s) described with respect to FIGS. 4, 5, and 7. For example, in some embodiments, the source donor CU receives, from a target donor CU (e.g., CU 2 illustrated and shown in FIG. 7), information regarding the at least one target donor DU, in response to the migration IAB node performing an inter CU migration procedure from "the source donor DU that is connected to the source donor CU (e.g., CU 1 illustrated and shown in FIG. 7)" to "the target donor DU that is connected to the target donor CU (e.g., CU 2 illustrated and shown in FIG. 7)".

Details described in all other embodiments of the present application (for example, details regarding how to transmit identification information to a source donor DU) are applicable for the embodiments of FIG. 6. Moreover, details described in the embodiments of FIG. 6 are applicable for all embodiments of FIGS. 1, 4, 5, and 7.

FIG. 7 illustrates an exemplary procedure of communications in accordance with some embodiments of the present disclosure. The embodiments of FIG. 7 aim to solve issues during a DL data transmission in a partial migration procedure, including: (1) a source donor DU needs to differentiate between normal DL packet(s) and the DL packet(s) that needs to be tunneled, and the rerouted DL packets need to be associated with the according migration IAB node; and (2) a source donor DU needs to know information about that a migration IAB node is connected to which target donor DU(s), and then, the source donor DU forwards the DL packet(s) to a proper target donor DU.

In some examples, CU 1 in FIG. 7 may function as CU 475 in FIG. 3. CU 2 in FIG. 7 may function as CU 476 in FIG. 3. DU 1 in FIG. 7 may function as DU 465 in FIG. 3. DU 2 in FIG. 7 may function as DU 466 in FIG. 3. IAB node 2 in FIG. 7 may function as IAB node 420C in FIG. 3. IAB node 3 in FIG. 7 may function as IAB node 420D in FIG. 3. IAB node 1 in FIG. 7 may function as an IAB node which is connected to DU 1 in FIG. 7 (e.g., DU 465 in FIG. 3) but has not migrated from DU 1. In FIG. 7, IAB node 2 may also be named as migration IAB node 2, and IAB node 3 may also be named as descendant IAB node 3.

In the embodiments of FIG. 7, in Step 701, DL packet(s) is transmitted from CU1 to DU1. The DL packet(s) includes DL packet(s) for IAB node 1, migration IAB node 2, and/or descendant IAB node 3, respectively.

In Step 702 of the embodiments of FIG. 7, source donor DU 1 differentiates "normal DL packet(s) for IAB node 1" from "the tunneled DL packet(s) for migration IAB node 2 and/or descendant IAB node 3". Source donor DU 1 is provided with IP address(es) of migration IAB node 2 and/or descendant IAB node 3. Based on the target IP address(es) in IP header(s) of the DL packet(s), source donor DU 1 can deduce whether to transmit the DL packet(s) via a IP tunnel between source donor DU 1 and a target donor DU (e.g., target donor DU 2 as shown in FIG. 7).

In Step 703 of the embodiments of FIG. 7, source donor DU1 needs to determine which target donor DU to be used for tunneling the DL packet(s). Firstly, after a migration procedure, migration IAB node 2 may be only connected to one or some donor DUs under a target IAB-donor architecture. Then, source donor DU 1 needs to be provided from source CU 1 with the information about target donor DU(s) (including target donor DU 2) that is connected by migration IAB node 2. In addition, in case of an inter CU migration procedure, such information needs to be provided from a target CU (e.g., CU 2) to source CU 1 (e.g., in a handover request acknowledge message).

In some embodiments of the present disclosure, the target donor DU(s) (including target donor DU 2) can be identified with a tunnel ID or a peer IP address of the target donor DU(s) for the tunnel. In some examples, since there may be two or more IAB nodes which perform a migration procedure, the above information (e.g., a tunnel ID or a peer IP address) about the target donor DU(s) may need to be provided with the association for migration IAB node 2.

In Step 704 of the embodiments of FIG. 7, source donor DU 1 transmits the DL packet(s) to the proper target Donor DU (e.g., target donor DU 2) in the tunnel between source donor DU 1 and the proper target Donor DU.

Details described in all of the foregoing embodiments of the present disclosure (e.g., embodiments of FIGS. 4-6) are applicable for the embodiments shown in FIG. 7. It should be appreciated by persons skilled in the art that the sequence of the operations in exemplary procedure in the embodiments of FIGS. 5-7 may be changed and some of the operations in exemplary procedure in the embodiments of FIGS. 5-7 may be eliminated or modified, without departing from the spirit and scope of the disclosure.

FIG. 8 illustrates a flow chart of a method for rerouting an uplink packet to a target donor DU in accordance with some embodiments of the present disclosure. The embodiments of FIG. 8 may be performed by an IAB node (e.g., IAB node 2 illustrated and shown in FIG. 10). Although described with respect to an IAB node, it should be understood that other devices may be configured to perform a method similar to that of FIG. 8.

In the exemplary method 800 as shown in FIG. 8, in operation 801, an IAB node receives an UL packet. A backhaul link destination of the UL packet is a source donor DU (e.g., S-DU illustrated and shown in FIG. 10) of a base station. In operation 802, the IAB node receives indication information which indicates whether a tunnel (e.g., IP tunnel illustrated and shown in FIG. 10) between the source donor DU and a target donor DU (e.g., T-DU 2 illustrated and shown in FIG. 10) has been setup.

In operation 803, the IAB node reroutes the UL packet to the target donor DU, in response to an absence of an available route from the IAB node to the source donor DU and the indication information indicating that the tunnel between the source donor DU and the target donor DU has been setup.

According to some embodiments, the indication information is received from a donor CU (e.g., CU illustrated and shown in FIG. 10) connected to the source donor DU. According to some embodiments, the indication information includes at least one of:

(1) configuration information regarding a backup backhaul adaptation protocol (BAP) address for a BAP address;

(2) configuration information regarding a backup BAP routing ID for a BAP routing ID;

(3) configuration information regarding an unavailable BAP address for the BAP address; and (4) configuration information regarding an unavailable BAP routing ID for the BAP routing ID.

It is contemplated that the method illustrated in FIG. 8 may include other operation(s) not shown, for example, any operation(s) described with respect to FIGS. 4, 9, and 10. Details described in all other embodiments of the present application (for example, details regarding how to reroute an uplink packet to a target donor DU) are applicable for the embodiments of FIG. 8. Moreover, details described in the embodiments of FIG. 8 are applicable for all embodiments of FIGS. 1, 4, 9, and 10.

FIG. 9 illustrates a flow chart of a method for transmitting indication information to an IAB node in accordance with some embodiments of the present disclosure. The embodiments of FIG. 9 may be performed by a source donor CU (e.g., CU illustrated and shown in FIG. 10) of a base station. Although described with respect to a source donor CU, it should be understood that other devices may be configured to perform a method similar to that of FIG. 9.

In the exemplary method 900 as shown in FIG. 9, in operation 901, a source donor CU (e.g., CU illustrated and shown in FIG. 10) of a base station receives identification information relating to at least one target donor DU (e.g., T-DU 1 and T-DU 2 illustrated and shown in FIG. 10). The identification information identifies a BAP address or a BAP routing ID for each of the at least one target donor DU. According to some embodiments, if the IAB node performs an inter CU migration procedure from "the source donor DU that is connected to the source donor CU" to "a target donor DU (e.g., T-DU 2 illustrated and shown in FIG. 10), that is connected to a target donor CU (e.g., a CU not shown in FIG. 10), within the at least one target donor DU", the identification information is received from the target donor CU (e.g., a CU not shown in FIG. 10).

In operation 902, the source donor CU transmits indication information to an IAB node. The indication information may indicate whether a tunnel between a source donor DU (e.g., S-DU illustrated and shown in FIG. 10) and the at least one target donor DU has been setup. According to some embodiments, the indication information includes at least one of:

(1) configuration information regarding a backup BAP address for a BAP address of a target donor DU (e.g., T-DU 2 illustrated and shown in FIG. 10) within the at least one target donor DU;

(2) configuration information regarding a backup BAP routing ID for a BAP routing ID of the target donor DU within the at least one target donor DU;

(3) configuration information regarding an unavailable BAP address for the BAP address; and (4) configuration information regarding an unavailable BAP routing ID for the BAP routing ID.

In some embodiments, if the BAP address identified by the identification information is of a target donor DU (e.g., T-DU 2 illustrated and shown in FIG. 10) and a tunnel between the source donor DU and the target donor DU has been setup, the indication information includes the configuration information regarding the backup BAP address for the BAP address of the target donor DU. If the BAP routing ID identified by the identification information is of the target donor DU and the tunnel between the source donor DU and the target donor DU has been setup, the indication information includes the configuration information regarding the backup BAP routing ID for the BAP routing ID of the target donor DU. If the BAP address identified by the identification information is of a target donor DU and the tunnel between the source donor DU and the target donor DU has not been setup, the indication information includes the configuration information regarding the unavailable BAP address for the BAP address of the target donor DU. If the BAP routing ID identified by the identification information is of the target donor DU and the tunnel between the source donor DU and the target donor DU has not been setup, the indication information includes the configuration information regarding the unavailable BAP routing ID for the BAP routing ID of the target donor DU.

It is contemplated that the method illustrated in FIG. 9 may include other operation(s) not shown, for example, any operation(s) described with respect to FIGS. 4, 8, and 10. Details described in all other embodiments of the present application (for example, details regarding how to transmit indication information to an IAB node) are applicable for the embodiments of FIG. 9. Moreover, details described in the embodiments of FIG. 9 are applicable for all embodiments of FIGS. 1, 4, 8, and 10.

FIG. 10 illustrates an exemplary procedure of communications in accordance with some embodiments of the present disclosure. The embodiments of FIG. 10 aim to solve an issue for a UL data transmission during a local rerouting procedure from a viewpoint of a migration IAB node that UL packet(s) may be randomly rerouted to a wrong target donor DU which has not setup a tunnel with a source donor DU.

In some examples, CU in FIG. 10 may function as IAB donor CU in FIG. 2. S-DU in FIG. 10 may function as IAB-donor-DU 1 in FIG. 2. T-DU 2 in FIG. 10 may function as IAB-donor-DU 1 in FIG. 2. T-DU 1 in FIG. 10 may function as a DU which is connected to CU in FIG. 10 (e.g., IAB donor CU in FIG. 2) but has not setup a tunnel with S-DU in FIG. 10. IAB node 1 in FIG. 10 may function as IAB node2 in FIG. 2. IAB node 2 in FIG. 10 may function as IAB node3 in FIG. 2. In FIG. 10, IAB node 2 may also be named as boundary IAB node 2.

In the embodiments of FIG. 10, in Step 1001, IAB node 2 is provided with the information whether source donor DU(s) (including S-DU shown in FIG. 10) and target donor DU(s) (e.g., T-DU 1 and/or T-DU 2 shown in FIG. 10) have setup tunnel(s). This information can be realized by following options.

1) Option A: CU shown in FIG. 10 configures a backup rerouting BAP address for each BAP address; or CU shown in FIG. 10 configures a backup rerouting BAP routing ID for each BAP routing ID.

2) Option B: CU shown in FIG. 10 only configures an unavailable rerouting BAP address for each BAP address; or CU shown in FIG. 10 only configures an unavailable rerouting BAP routing ID for each BAP routing ID.

For both Option A and Option B, in the case of an inter CU rerouting procedure, source CU needs to be informed for the BAP address(es) of target donor DU(s) (e.g., T-DU 1 and/or T-DU 2 shown in FIG. 10) or BAP routing ID(s) used in the target path.

In Step 1002 of the embodiments of FIG. 10, IAB node 2 receives UL packet(s) which is originally targeted to S-DU shown in FIG. 10. However, the source path suffers some unexpected case, e.g., a RLF. Then, the UL packet(s) may need to be rerouted to another target donor DU (e.g., T-DU 2 shown in FIG. 10).

In Step 1003 of the embodiments of FIG. 10, IAB node 2 performs a UL data rerouting procedure to another available path which is terminated to another target donor DU (e.g., T-DU 2 shown in FIG. 10).

Details described in all of the foregoing embodiments of the present disclosure (e.g., embodiments of FIGS. 4, 8, and 9) are applicable for the embodiments shown in FIG. 10. It should be appreciated by persons skilled in the art that the sequence of the operations in exemplary procedure in the embodiments of FIGS. 8-10 may be changed and some of the operations in exemplary procedure in the embodiments of FIGS. 8-10 may be eliminated or modified, without departing from the spirit and scope of the disclosure.

FIG. 11 illustrates a flow chart of a method for selecting an uplink packet based on indication information in accordance with some embodiments of the present disclosure. The embodiments of FIG. 11 may be performed by a target donor DU (e.g., DU 1 illustrated and shown in FIG. 13) of a base station. Although described with respect to a target donor DU, it should be understood that other devices may be configured to perform a method similar to that of FIG. 11.

In the exemplary method 1100 as shown in FIG. 11, in operation 1101, a target donor DU (e.g., DU 2 illustrated and shown in FIG. 13) of a base station receives one or more UL packets from one or more IAB nodes (e.g., IAB node 2 and/or IAB node 3 illustrated and shown in FIG. 13).

In operation 1102, the target donor DU selects a 1st subset and/or a 2nd subset within the one or more UL packets based on indication information included in each UL packet of the one or more UL packets. The indication information included in each UL packet is associated with a source IP address or a BAP header of each UL packet. A backhaul link destination of each UL packet within the 1st subset is terminated at the target donor DU. A backhaul link destination of each UL packet within the 2nd subset is terminated at a source donor DU (e.g., DU 1 illustrated and shown in FIG. 13).

According to some embodiments, the indication information included in each UL packet indicates: whether a source IP address of each UL packet is within an IP pool of the target donor DU (e.g., DU 2 illustrated and shown in FIG.

13); or an indication in a BAP header of each UL packet. In some embodiments, the indication is added by an IAB node (e.g., IAB node 2 illustrated and shown in FIG. 13) to the BAP header of each UL packet. In some embodiments, the IAB node is a boundary IAB node (e.g., IAB node 2 illustrated and shown in FIG. 13) which performs a BAP header rewriting operation for each UL packet.

It is contemplated that the method illustrated in FIG. 11 may include other operation(s) not shown, for example, any operation(s) described with respect to FIGS. 4, 12, and 13. For example, according to some embodiments, a tunnel (e.g., IP tunnel illustrated and shown in FIG. 13) between the target donor DU and the source donor DU has been setup, and the target donor DU transmits, via the tunnel, the 2nd subset of UL packet(s) to the source donor DU.

According to some embodiments, the target donor DU (e.g., DU 2 illustrated and shown in FIG. 13) receives configuration information from a donor CU (e.g., CU 1 illustrated and shown in FIG. 13) connected to the target donor DU. In some embodiments, the configuration information includes at least one of:

(1) mapping relationship between: source IP addresses of the one or more UL packets, and IDs of one or more tunnels between the one or more source donor DUs and the target donor DU;

(2) mapping relationship between: BAP routing IDs in BAP headers of the one or more UL packets, and the IDs of the one or more tunnels; and (3) mapping relationship between: BAP addresses in the BAP headers of the one or more UL packets, and the IDs of the one or more tunnels.

Details described in all other embodiments of the present application (for example, details regarding how to select an uplink packet based on indication information) are applicable for the embodiments of FIG. 11. Moreover, details described in the embodiments of FIG. 11 are applicable for all embodiments of FIGS. 1, 4, 12, and 13.

FIG. 12 illustrates a flow chart of a method for transmitting configuration information to a target donor DU in accordance with some embodiments of the present disclosure. The embodiments of FIG. 12 may be performed by a source donor CU (e.g., CU 1 illustrated and shown in FIG. 13) of a base station. Although described with respect to a source donor CU, it should be understood that other devices may be configured to perform a method similar to that of FIG. 12.

In the exemplary method 1200 as shown in FIG. 12, in operation 1201, a source donor CU of a base station generates configuration information. The configuration information includes at least one of: (1) mapping relationship between: source IP addresses of one or more UL packets, and IDs of one or more tunnels between the one or more source donor DUs and the target donor DU; (2) mapping relationship between: BAP routing IDs in BAP headers of the one or more UL packets, and the IDs of the one or more tunnels; and (3) mapping relationship between: BAP addresses in the BAP headers of the one or more UL packets, and the IDs of the one or more tunnels. In operation 1202, the source donor CU transmits the configuration information to a target donor DU (e.g., DU 2 illustrated and shown in FIG. 13).

It is contemplated that the method illustrated in FIG. 12 may include other operation(s) not shown, for example, any operation(s) described with respect to FIGS. 4, 11, and 13. Details described in all other embodiments of the present application (for example, details regarding how to transmit configuration information to a target donor DU) are applicable for the embodiments of FIG. 12. Moreover, details described in the embodiments of FIG. 12 are applicable for all embodiments of FIGS. 1, 4, 11, and 13.

FIG. 13 illustrates an exemplary procedure of communications in accordance with some embodiments of the present disclosure. The embodiments of FIG. 13 aim to solve an issue during a UL data transmission for a local rerouting procedure or a partial migration procedure from a viewpoint of a target donor DU that a target donor DU needs to differentiate between normal UL packet(s) and the UL packet(s) that needs to be tunneled and then transmits the UL packet(s) to a proper source donor DU.

In some examples, CU 1 in FIG. 13 may function as CU 475 in FIG. 3. CU 2 in FIG. 13 may function as CU 476 in FIG. 3. DU 1 in FIG. 13 may function as DU 465 in FIG. 3. DU 2 in FIG. 13 may function as DU 466 in FIG. 3. IAB node 2 in FIG. 13 may function as IAB node 420C in FIG. 3. IAB node 3 in FIG. 13 may function as IAB node 420D in FIG. 3. IAB node 1 in FIG. 13 may function as an IAB node which is connected to DU 1 in FIG. 13 (e.g., DU 465 in FIG. 3) but has not migrated from DU 1. In FIG. 13, IAB node 2 may also be named as boundary IAB node 2.

In the embodiments of FIG. 13, in Step 1301, target donor DU 2 receives UL packet(s) from boundary IAB node 2, which is originally terminated to source donor DU 1 and is referred as "the UL packets that need to be transmitted to source donor DU 1", and target donor DU 2 receives UL packet(s) from other descendant IAB node(s) of target donor DU 2 which is terminated to target donor DU 2 itself and referred as "normal UL packets".

In Step 1302 of the embodiments of FIG. 13, target donor DU 2 differentiates between "normal UL packets" and "the UL packets that need to be transmitted to source donor DU 1". For different UL packet(s) that needs to be transmitted in the tunnel (e.g., IP tunnel as shown in FIG. 13), behaviors of target donor DU 2 can be as follows:

1) Option (1): if the UL packet(s) is IP packet(s), based on whether the source IP address is within the IP pool of target donor DU or not, behaviors of target donor DU 2 can be different. For example, target donor DU 2 may only forward the UL packet(s) within the IP pool to its donor CU, e.g., CU 2 as shown in FIG. 13.

2) Option (2): if the UL packet(s) is BAP packet(s), an explicit indication (which may be added by boundary IAB node 2) in a BAP header of the UL packet(s) may indicate differences between "normal UL packet(s)" and "the UL packet(s) that needs to be transmitted in the tunnel".

In Step 1303 of the embodiments of FIG. 13, target donor DU 2 determines which source donor DU or which tunnel to be used for data forwarding.

1) Option (a): if the UL packet(s) is IP packet(s), since different IP addresses are configured for IAB nodes terminated to different source donor DUs, once target donor DU 2 is configured with mapping relationship between source IP addresses and source donor DU 1 (or the tunnel ID), target donor DU 2 can forward the UL packet(s) to the according tunnel.

2) Option (b): if the UL packet(s) is BAP packet(s), different original BAP address can uniquely indicate the according source donor DU 1. However, boundary IAB node 2 will perform a BAP header rewriting operation with a new BAP routing ID (or a new BAP address). After rewriting, the uniqueness needs to be maintained, but this is up to implementations. Once target donor DU 2 is configured, by the donor CU, with "mapping relationship between a new BAP routing ID and an old BAP routing ID and the tunnel ID" or "mapping relationship between the new BAP routing ID and the tunnel ID", target donor DU 2 can forward the UL packet(s) to the according tunnel. The tunnel ID may be identified by the old BAP routing ID or the source IP address of the tunnel. Or, the tunnel ID may be identified by an explicit numbering index.

In Step 1304 of the embodiments of FIG. 13, target donor DU 2 transmits the UL packet(s) to the proper source donor DU 1 in the tunnel.

Details described in all of the foregoing embodiments of the present disclosure (e.g., embodiments of FIGS. 4, 11, and 12) are applicable for the embodiments shown in FIG. 13. It should be appreciated by persons skilled in the art that the sequence of the operations in exemplary procedure in the embodiments of FIGS. 11-13 may be changed and some of the operations in exemplary procedure in the embodiments of FIGS. 11-13 may be eliminated or modified, without departing from the spirit and scope of the disclosure.

Those having ordinary skill in the art would understand that the operations or steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the operations or steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in other embodiments. Also, all of the elements of each figure are not necessary for the operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including." Expressions such as "A and/or B" or "at least one of A and B" may include any and all combinations of words enumerated along with the expression. For instance, the expression "A and/or B" or "at least one of A and B" may include A, B, or both A and B. The wording "the first," "the second" or the like is only used to clearly illustrate the embodiments of the present application, but is not used to limit the substance of the present application.

What is claimed:

1. A source donor distributed unit (DU) of a base station, comprising:
   at least one memory; and
   at least one processor coupled with the at least one memory, wherein the source donor DU is coupled to a donor centralized unit (CU) of the base station, and the at least one processor is configured to cause the source donor DU to:
   receive, from the donor CU of the base station, address information relating to at least one integrated access and backhaul (IAB) node; and
   transmit a downlink packet to a target donor DU within at least one target donor DU via a tunnel between the source donor DU and the target donor DU based on differentiating one or more downlink packets for the at least one IAB node from one or more downlink packets for a migration IAB node or a descendant IAB node, wherein the downlink packet is associated with the address information relating to the at least one IAB node.

2. The source donor DU of claim 1, wherein the at least one processor is further configured to cause the source donor DU to receive, from the donor CU, configuration information regarding a mapping relationship between a subset of the address information and the target donor DU, wherein the downlink packet is associated with the subset of the address information.

3. The source donor DU of claim 2, wherein the at least one IAB node is:
   a migration IAB node, wherein the migration IAB node is migrated from the source donor DU to the target donor DU; or
   one or more descendant IAB nodes of the migration IAB node.

4. The source donor DU of claim 3, wherein the address information includes at least one of:
   at least one internet protocol (IP) address of the migration IAB node; or
   at least one IP address of each of the one or more descendant IAB nodes of the migration IAB node.

5. The source donor DU of claim 1, wherein the at least one processor is further configured to:
   receive, from the donor CU, identification information relating to the at least one target donor DU.

6. The source donor DU of claim 5, wherein the identification information includes at least one of:
   an identifier (ID) of a tunnel between the source donor DU and the target donor DU within the at least one target donor DU; or
   a peer internet protocol (IP) address of the target donor DU, wherein the peer IP address is associated with the tunnel between the source donor DU and the target donor DU.

7. A source donor centralized unit (CU) of a base station, comprising:
   at least one memory; and
   at least one processor coupled with the at least one memory, wherein the source donor CU is coupled to a source donor DU of the base station, and the at least one processor is configured to cause the source donor CU to:
   generate identification information relating to at least one target donor distributed unit (DU), so that a downlink packet can be transmitted from the source donor DU to a target donor DU within at least one target donor DU, wherein each target donor DU within the at least one target donor DU has a path to at least one integrated access and backhaul (IAB) node, wherein the at least one IAB node is a migration IAB node which is migrated from the source donor DU to the target DU;

receive, from a target donor CU, information regarding the at least one target donor DU in response to the migration JAB node performing an inter-CU migration procedure from the source donor DU that is connected to the source donor CU to the target donor DU that is connected to the target donor CU; and transmit the identification information relating to the target donor DU to the source donor DU.

8. The source donor CU of claim 7, wherein the identification information includes at least one of:

an identifier (ID) of a tunnel between the source donor DU and the target donor DU; or a peer internet protocol (IP) address of the target donor DU within the target donor DU, wherein the peer IP address is associated with the tunnel between the source donor DU and the target donor DU.

9. A source donor centralized unit (CU) of a base station, comprising:

at least one memory; and at least one processor coupled with the at least one memory, wherein the at least one processor is configured to cause the source donor CU to:

receive identification information relating to at least one target donor distributed unit (DU), wherein the identification information identifies a backhaul adaptation protocol (BAP) address or a BAP routing identifier (ID) for each of the at least one target donor DU; and transmit indication information to an integrated access and backhaul (IAB) node, wherein the indication information indicating whether a tunnel between a source donor DU and the at least one target donor DU has been setup, wherein the source donor DU is a backhaul link destination of one or more uplink (UL) packets, and wherein the one or more UL packets are rerouted to the at least one target donor DU based on a current path between the IAB node and the source donor DU being unavailable and the indication information indicating that the tunnel between the source donor DU and the at least one target donor DU has been setup.

10. The source donor CU of claim 9, wherein the indication information includes at least one of:

configuration information regarding a backup BAP address for the BAP address of a target donor DU within the at least one target donor DU;

configuration information regarding a backup BAP routing identifier (ID) for a BAP routing ID of the target donor DU;

configuration information regarding an unavailable BAP address for the BAP address; or configuration information regarding an unavailable BAP routing ID for the BAP routing ID.

11. The source donor CU of claim 10, wherein:

if the BAP address identified by the identification information is of the at least one target donor DU and the tunnel between the source donor DU and the at least one target donor DU has been setup, the indication information includes the configuration information regarding the backup BAP address for the BAP address;

if the BAP routing ID identified by the identification information is of the at least one target donor DU and the tunnel between the source donor DU and the at least one target donor DU has been setup, the indication information includes the configuration information regarding the backup BAP routing ID for the BAP routing ID;

if the BAP address identified by the identification information is of a target donor DU of the at least one target donor DU and the tunnel between the source donor DU and the target donor DU has not been setup, the indication information includes the configuration information regarding the unavailable BAP address for the BAP address; and if the BAP routing ID identified by the identification information is of the target donor DU of the at least one target donor DU and the tunnel between the source donor DU and the target donor DU has not been setup, the indication information includes the configuration information regarding the unavailable BAP routing ID for the BAP routing ID.

12. The source donor CU of claim 9, wherein the identification information is received from a target donor CU, in response to the IAB node performing an inter CU migration procedure from the source donor DU that is connected to the source donor CU to a target donor DU that is connected to the target donor CU within the at least one target donor DU.

13. A method performed by a source donor distributed unit (DU) of a base station, the method comprising:

receiving, from a donor centralized unit (CU) of the base station, address information relating to at least one integrated access and backhaul (IAB) node, wherein the source donor DU is coupled to the donor CU of the base station; and transmitting a downlink packet to a target donor DU within at least one target donor DU via tunnel between the source donor DU and the target donor DU based on differentiating one or more downlink packets for the at least one IAB node from one or more downlink packets for a migration IAB node or a descendant IAB node, wherein the downlink packet is associated with the address information relating to the at least one IAB node.

14. The method of claim 13, further comprising receiving, from the donor CU, configuration information regarding a mapping relationship between a subset of the address information and the target donor DU, wherein the downlink packet is associated with the subset of the address information.

15. The method of claim 14, wherein the at least one IAB node is:

a migration IAB node, wherein the migration IAB node is migrated from the source donor DU to the target donor DU; or one or more descendant IAB nodes of the migration IAB node.

16. The method of claim 15, wherein the address information includes at least one of:

at least one internet protocol (IP) address of the migration IAB node; or at least one IP address of each of the one or more descendant IAB nodes of the migration IAB node.

17. The method of claim 13, further comprising:

receiving, from the donor CU, identification information relating to the at least one target donor DU.

18. The method of claim 17, wherein the identification information includes at least one of:

an identifier (ID) of a tunnel between the source donor DU and the target donor DU within the at least one target donor DU; or a peer internet protocol (IP) address of the target donor DU, wherein the peer IP address is associated with the tunnel between the source donor DU and the target donor DU.

\* \* \* \* \*